UNITED STATES PATENT OFFICE.

MAX LEONARD TOWER, OF MIDDLEPORT, NEW YORK.

PROCESS OF MAKING ARSENATE OF LEAD.

1,387,212.　　　　　　Specification of Letters Patent.　　Patented Aug. 9, 1921.

No Drawing.　　　Application filed August 3, 1920.　Serial No. 400,899.

*To all whom it may concern:*

Be it known that I, MAX L. TOWER, a citizen of the United States, and a resident of Middleport, county of Niagara, and State of New York, have invented a new and Improved Process of Making Arsenate of Lead, of which the following is a full, clear, and exact description.

This invention relates to an improved process of manufacturing arsenate of lead, and has for an object the production of a soft, fine, precipitate of arsenate of lead which is suitable for use as an insecticide with little grinding.

Another object of this invention is to provide a process of manufacturing arsenate of lead in which a means is provided for reducing the percentage of soluble arsenate present in the insecticide below the amount which is permitted by the laws controlling the quality of insecticides.

I am aware that various processes have been proposed for the making of lead arsenate suitable for insecticides and that some of these processes have been patented with various improvements.

My process consists essentially in forming a basic or normal lead acetate by the treatment of litharge or other lead oxid with acetic acid. The resulting normal or basic lead acetate dissolved in water is treated with the theoretical quantity of arsenic acid admitted in fine streams. The resulting soft and fine precipitate of arsenate of lead is filtered off in a filter press and washed with cold water; the filtrate and washes containing the acetic acid set free by the reaction of the arsenic acid is used for treating a subsequent quantity of litharge. If necessary, the press cake is sludged in a tank with a little dilute caustic soda or sodium carbonate to remove a slight excess of soluble arsenic acid or lead arsenate which seems to be occluded by the arsenate of lead.

The process more in detail consists in dissolving 900 pounds of 80% acetic acid in about 1800 gallons of water. 2675 pounds of litharge is next sifted into the acetic acid solution and when all the litharge is dissolved, there is added through a perforated pipe adapted to deliver a number of small streams, 2285 pounds of 75% arsenic acid with constant agitation. The addition of acid in small streams prevents the formation of large masses of lead ortho arsenate and facilitates the quick completion of the reaction inasmuch as the amount of agitation required to disintegrate the recently formed masses is not as great as it would be if extremely large masses were formed by the addition of a single large stream of acid. The formation of large masses of lead ortho arsenate also prevents prompt action of acid upon the ortho arsenate and thereby retards the completion of the reaction. This difficulty is prevented by the addition of the acid in small streams with a consequent formation of small masses of ortho arsenate which are quickly broken down and further react promptly to form the acid or pyro- arsenate of lead. No attempt is made to vary the temperature resulting from the exothermal heat given off during the reaction since we have found that the resulting temperature is best suited for the production of an extremely fine precipitate of arsenate of lead. After the solution is stirred by any mechanical means to a uniform creamy mass, it is filtered in a filter press and washed in the press with cold water. The acetic acid liberated by the reaction of the arsenic acid, passes into the filtrate and with the first portions of the wash water is used for treatment of the subsequent batches of litharge.

I have found that the normal or basic acetate of lead is superior to all other salts of lead for the preparation of an extremely fine and soft precipitate of lead arsenate which will require little grinding for use as an insecticide. By the use of the acetate of lead, any commercial grade of litharge may be used and it is unnecessary to employ a lead oxid of any special grade, thus considerably cheapening the cost of manufacture of the arsenate of lead. I find that the reaction between the arsenic acid and the normal or basic lead acetate proceeds very fast which is a great advantage in obtaining uniform success by this process with a minimum amount of time consumed for the reactions. I also find that the acetic acid given off during the reaction of the basic or normal lead acetate with the arsenic acid, does not volatilize so that the loss of acetic acid is reduced to a minimum, and any slight mechanical losses can be made up from time to time by the further addition of further acid.

It is found that the washed filter cake of lead arsenate occludes a small quantity of arsenic acid and soluble arsenate of lead. At times the amount of soluble arsenic present in the insecticide is above the amount permitted by laws controlling the quality of insecticides. When this occurs I stir or sludge the filter press cake in a tank with a small quantity of dilute caustic soda or sodium carbonate equivalent to about 0.25% of its weight, after which the precipitate is refiltered, rewashed, and dried by any suitable method. But this treatment, however, is not always necessary. The arsenate of lead formed seems to have a greater insolubility in the acetic acid formed in the reaction than in other acids, such as nitric acid, so that the amount of soluble arsenic in the product is usually below that obtained by other processes. Any grade of acetic acid may be used in the process, and it is unnecessary as pointed out to employ any artificial heat to carry on the process. The reactions take place so readily that a minimum amount of apparatus is required to turn out a large quantity of product.

I would state in conclusion that the proportions above specified as used in the process can be varied through wide limits without departing from the spirit of the invention as defined in the appended claims.

Having thus described my invention, I claim as new and desire to secure by Letters Patent:

1. A process of making arsenate of lead which consists in dissolving litharge in a dilute solution of acetic acid, adding arsenic acid in small streams, and filterng off the resulting precipitate of arsenate of lead.

2. A process of making arsenate of lead which consists in dissolving litharge in a dilute solution of acetic acid, adding arsenic acid in small streams, filtering off the resulting precipitate of arsenate of lead, washing said precipitate of arsenate of lead, and treating said precipitate with a dilute solution of caustic soda.

3. A process of making arsenate of lead which consists in dissolving litharge in a dilute solution of acetic acid, adding arsenic acid in small streams, filterng off the resulting precipitate of arsenate of lead, washing said precipitate of arsenate of lead, and treating said precipitate with a dilute solution of sodium carbonate.

4. A process of making arsenate of lead which consists substantially in sifting approximately 2675 pounds of litharge into a solution containing 900 pounds of 80% acetic acid in about 1800 gallons of water, adding about 2285 pounds of 75% arsenic acid to said solution in a plurality of small streams, stirring the resulting mixture to a uniform creamy mass, and filtering the resulting precipitate.

5. A process of making arsenate of lead which consists substantially in sifting approximately 2675 pounds of litharge into a solution containing 900 pounds of 80% acetic acid in about 1800 gallons of water, adding about 2285 pounds of 75% arsenic acid to said solution in a plurality of small streams, stirring the resulting mixture to a uniform creamy mass, filtering the resulting precipitate, washing said precipitate, treating said precipitate with a dilute solution of caustic soda, and filtering, washing and drying said precipitate.

6. A process of making arsenate of lead which consists in dissolving litharge in a dilute solution of acetic acid, adding arsenic acid to said solution in small streams, filtering and washing the resulting precipitate, treating said precipitate with a dilute solution of sodium carbonate equivalent to about 0.25% of its weight, and filtering, washing and drying said precipitate.

MAX LEONARD TOWER.